Patented Feb. 17, 1948

2,436,304

UNITED STATES PATENT OFFICE 2,436,304

METHOD OF PREPARING BASE MEMBERS FOR DYEING

Oscar Kenneth Johannson, Corning, N. Y., assignor to Corning Glass Works, Corning, N. Y., a corporation of New York No Drawing. Application June 11, 1943, Serial No. 490,515

9 Claims. (Cl. 8—8)

This invention relates to coatings on solid or fibrous bodies and materials, and particularly to organic coatings.

It is often necessary and desirable to coat articles with various organic materials, such as resins, lacquers, etc. Such materials do not always adhere with sufficient tenacity to be satisfactory for the purpose in view because of the organophobic nature of the surfaces of the articles. For instance, objectionable separation of the laminations of laminated sheet glass sometimes occurs due to insufficient adhesion between the organic plastic and the glass. The lacquer coatings on decorative glassware, such as Christmas tree ornaments and the like, are sometimes too easily rubbed off in handling or weakened by contact with water or moisture with consequent peeling of the coating from the glass. Organic dyes do not adhere to non-porous, vitreous surfaces and ordinary glass cannot be dyed.

The primary object of this invention is to provide an adherent overlying coating for base members.

A further object is to provide a method of applying adherent overlying coatings to base members.

Another object is to provide an improved method of applying adherent organic coatings to base members.

Another object is to provide organophobic base members with adherent films which act as bonding agents for organic resins, lacquers and the like.

Another object is to bond organic resins, lacquers and the like to base members of siliceous character.

Another object is to provide a method for increasing the adhesion of organic resins, lacquers and the like to glass surfaces.

Still another object is to provide an invisible and permanently attached priming coat on normally organophobic base members for the irreversible attachment of organic compositions.

My invention is predicated upon my discovery that organophobic surfaces become organophilic when treated with organo-silicon compounds comprising hydrolyzable organo-silicanes, their hydrolysis products or their polymerized hydrolysis products, and that the adhesion or organic compositions such as resins, plastics, lacquers, paints, dyes and the like to the organophilic surfaces thus provided is substantially greater than it is for the original untreated surfaces.

By hydrolyzable organo-silicanes, I mean derivatives of $SiH_4$ which contain readily hydrolyzable radicals such as halogens, amino groups, alkoxy, aryloxy, and acyloxy radicals, etc., the remaining valences of the silicon atoms being satisfied by organic radicals that are joined to the silicon atoms through carbon atoms. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, xenyl, etc.; naphthyl, mono- and poly-alkyl naphthyls as methyl naphthyl, diethyl naphthyl, tri-propyl naphthyl, etc.; tetrahydronaphthyl, anthracyl, etc.; aralkyl such as benzyl, phenylethyl, etc.; alkenyl such as methallyl, allyl, etc.; and heterocyclic radicals. The above organic radicals may also, if desired, contain inorganic substituents such as halogens, etc.

Hydrolysis of the above described silicanes produces the corresponding hydroxy silicanes (sometimes called silicols) which in certain instances may be isolated. However, in most cases, the hydroxy silicanes condense, particularly if heated, to form polymers which contain one or more Si—O—Si groups. These polymers may in turn be further polymerized to higher polymers by suitable treatment such as by acid, alkali or air as disclosed in the copending application of James Franklin Hyde, Sr. No. 481,155 filed March 30, 1943, assigned to the assignee of the present application. If desired, the hydrolysis product and higher polymers of a mixture of organo-silicanes may be employed in accordance with my invention. The hydrolysis product of such a mixture is generally a copolymer which may contain various amounts of differently substituted organo-silicon units as disclosed in the copending application of James Franklin Hyde, Sr. No. 432,528 filed February 26, 1942, and assigned to the assignee of this application. All of these compounds and mixtures, namely, the organo-silicanes, their hydrolysis products and their polymerized hydrolysis products are within the scope of my invention as useful primary coatings for base members which are to be coated with organic compositions.

In the practice of my invention a primary coating is applied to the base member by contacting the latter with one or more of the aforesaid hydrolyzable organo-silicanes, their hydrolysis products or their polymerized hydrolysis products as priming agents and thereafter another organic material such as a resin, plastic, gum, lacquer, paint, dye or the like, is applied to the treated surface of the base member.

The primary coat may be applied to the base member by dipping it or by spraying it with the liquid priming agent or its solution. Alternatively, the primary coat may be applied to the base member by exposing the latter to the vapors formed by heating or by blowing air or steam through the priming agent. The excess of primary coat may, if desired, be removed by washing and rinsing the treated surface with fresh solvent, although the presence of an excess is usually not objectionable. After the base member has thus been treated, a thin, invisible film, only a few molecules thick, will remain strongly adsorbed on the treated surface although the latter is repeatedly washed with fresh solvent.

I have found that the general effectiveness of the priming treatment and adherence of the film is improved if the base member is heated after the treatment at a temperature below the boiling point or decomposition temperature of the compound employed, particularly when it is an ester. Heating for a few minutes to an hour is sufficient. For reasons not understood, such heating does not destroy the invisible film but, on the contrary, seems to improve its stability. For optimum results I prefer to use lower alkyl radicals and aryl radicals.

My new method provides improved means for bonding coating materials to various kinds of articles. Materials which can thus be bonded include plastics, resins (including resinous organo-silicon polymers), lacquers, dyes, optical cements, etc. I have found that my invention is particularly applicable to base members of a siliceous composition but is not limited to such base members since other materials such as metals, etc., have been successfully primed in accordance with my invention. If desired, base members of an organic nature may also be similarly treated in accordance with my invention.

For a better understanding of my invention reference should be had to the following examples which illustrate but do not limit the scope of my invention.

Example No. 1

Glass fibres were dipped in a solution of 1.7% of phenylsilicon trichloride in benzene, rinsed with pure benzene and dried. They were then dipped in a water solution of an organic dye known as Victoria Green, Colour Index 657. The fibres became dyed. They were then immersed for seven hours in boiling water after which they still retained their color. In contrast to this, glass fibres, which had no preliminary treatment with phenylsilicon trichloride when dipped directly into dye solution, could be washed completely free of the dye with cold water. Other dyestuffs, including Victoria Blue, Colour Index 728, Phosphine NO, Colour Index 793, and Acridine Orange, Colour Index 788, produced the same result.

Example No. 2

Glass fibres were primed by dipping them into a 2% solution of methallylsilicon trichloride in benzene and allowing them to dry in air. They were then heated for fifteen minutes at 180° C. The primed fibres then adsorbed and retained various dyes such as Methyl Violet, Colour Index 680, Victoria Green, Colour Index 657, also rhodamine B, and methylene blue. The colors were only slightly decreased in intensity by prolonged immersion in water at 90° C.

Example No. 3

Glass fibres were primed by dipping them into a 2% solution of phenyldimethylsilicon chloride, dried in air and heated for fifteen minutes at 180° C. The retention of dyes was markedly stronger than when the fibres were primed with methallylsilicon trichloride, as in Example 2.

Example No. 4

Glass fibre type was dipped in a 1% solution of benzyl-silicon trichloride in benzene and was dried and then immersed for a half hour in a solution of 0.1% water solution of Malachite Green, Colour Index 657. A sample of unprimed tape was also immersed for a half hour in a like solution of the same type. The dyed samples were then individually immersed in pure water heated at 70°–80° C. After ten minutes' immersion the unprimed sample had lost about half of the color absorbed thereon, but no color was removed from the primed sample even after thirty minutes.

Example No. 5

Glass fibres were moistened with a benzene solution of paradimethylaminophenyltriethoxysilicane, $(CH_3)_2NC_6H_4Si(OC_2H_5)_3$, and dried at 260° C. The primed fibres were then treated with an ice-cold solution of sodium acetate to which was added a small amount of solution of diazotized aniline hydrochloride. The fibres became colored yellow, due to a dye which was formed in situ on the surface of the glass by the reaction of the chromophore group of the diazotized aniline hydrochloride with the auxochrome grouping of the prime coating. The dye could not be washed off from the fibres with water.

Besides the silicanes in the above examples, the hydrolysis products and polymerized hydrolysis products of the silicanes may also be used effectively as priming agents in similar manner, both on glass and other surfaces hereinbefore described. Among these are the following: phenylethyl silicane diol, diphenyl silicane diol, methyl silicone, ethyl silicone, propyl silicone, butyl silicone, phenyl ethyl silicone, phenyl methyl silicone, phenyl silicone, etc.

I claim:

1. The method of coating a siliceous base member which comprises priming the surface of the base member with an invisible film comprising a hydrolyzable organo-silicane, heating the primed base member at a temperature below the decomposition point of the silicane, and thereafter applying to the primed surface a basic organic dye, said organo-silicane containing organic radicals attached to silicon through carbon-silicon linkages and readily hydrolyzable radicals attached directly to silicon and consisting of halogens.

2. The method of coating a siliceous base member which comprises priming the surface of the base member with a composition comprising an organo-silicon halide and thereafter applying to the primed surface a basic organic dye, the organic substituents of said organo-silicon halide being organic radicals attached to silicon through carbon-silicon linkages.

3. The method of coating a siliceous base member which comprises priming the surface of the base member with a composition comprising an organo-silicon trichloride and thereafter applying to the primed surface a basic organic dye, the organic substituents of said trichloride being organic radicals attached to silicon through carbon-silicon linkages.

4. The method of coating a siliceous base member which comprises priming the surface of the base member with a composition comprising an arylsilicon trichloride and thereafter applying to the primed surface a basic organic dye.

5. The method of coating a siliceous base member which comprises priming the surface of the base member with a composition comprising phenylsilicon trichloride and thereafter applying to the primed surface a basic organic dye.

6. The method of coating a siliceous base member which comprises priming the surface of the base member with phenylsilicon trichloride and thereafter applying to the primed surface the organic dye Victoria Green, Colour Index 657.

7. An article of manufacture comprising a siliceous base member having a surface which has been primed with an aryl-silicon trichloride and having a basic organic dye applied to said primed surface.

8. An article of manufacture comprising a siliceous base member having a surface which has been primed with phenyl-silicon trichloride and having a basic organic dye applied to said primed surface.

9. An article of manufacture comprising a glass article having a surface which has been primed with phenylsilicon trichloride and having a basic organic dye applied to said primed surface.

OSCAR KENNETH JOHANNSON.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,219 | Rochow | Oct. 7, 1941 |
| 2,306,222 | Patnode | Dec. 22, 1942 |
| 2,315,329 | Hood | Mar. 30, 1943 |
| 2,215,048 | McGregor | Sept. 17, 1940 |
| 2,245,783 | Hyde | June 17, 1941 |

FOREIGN PATENTS

| Number | Country | Date |
| --- | --- | --- |
| 113,078 | Australia | Sept. 4, 1941 |